(12) United States Patent
Hsu et al.

(10) Patent No.: US 10,838,503 B2
(45) Date of Patent: Nov. 17, 2020

(54) VIRTUAL REALITY CLAMSHELL COMPUTING DEVICE

(71) Applicant: Hewlett-Packard Development Company, L.P., Houston, TX (US)

(72) Inventors: Joe Hsu, Taipei (TW); Yu-Hung Li, Taipei (TW); Hao-Cheng Chuang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 315 days.

(21) Appl. No.: 15/500,469

(22) PCT Filed: Jul. 31, 2014

(86) PCT No.: PCT/US2014/049107
§ 371 (c)(1),
(2) Date: Jan. 30, 2017

(87) PCT Pub. No.: WO2016/018355
PCT Pub. Date: Feb. 4, 2016

(65) Prior Publication Data
US 2017/0212602 A1 Jul. 27, 2017

(51) Int. Cl.
*G06F 3/01* (2006.01)
*G06F 3/0481* (2013.01)
(Continued)

(52) U.S. Cl.
CPC ............ *G06F 3/017* (2013.01); *G06F 1/1616* (2013.01); *G06F 1/1639* (2013.01);
(Continued)

(58) Field of Classification Search
None
See application file for complete search history.

(56) References Cited

U.S. PATENT DOCUMENTS 7,468,742 B2 12/2008 Ahn et al.
7,626,607 B2 12/2009 Aoki et al.
(Continued)

FOREIGN PATENT DOCUMENTS

CN 202486745 U 10/2012
WO WO-2014/032089 A1 3/2014

OTHER PUBLICATIONS

Joseph J. La Viola Jr., et al., "3D Spatial Interaction: Applications for Art, Design, and Science," A SIGGRAPH 2011 Course, Aug. 7, 2011, pp. 1-75.
(Continued)

*Primary Examiner* — David D Davis
(74) *Attorney, Agent, or Firm* — Fabian VanCott

(57) ABSTRACT

A virtual reality clamshell computing device includes a number of projection devices to project a three-dimensional image, a number of infrared OR illumination devices to illuminate a users hand, a number of IR sensors to detect IR wavelengths reflected off of the users hand, a processor, and a memory. The memory includes executable code that, when executed by the processor, extracts coordinate location data from the detected IR wavelengths reflected off of the users hand, interprets the coordinate location as a number of gestures performed by the user, and manipulates the display of the three-dimensional image based on the interpreted gestures.

20 Claims, 6 Drawing Sheets

(51) Int. Cl.
  *H04N 9/31* (2006.01)
  *H04N 13/39* (2018.01)
  *G06F 1/16* (2006.01)
  *G06F 3/03* (2006.01)

(52) U.S. Cl.
  CPC ........ *G06F 3/0325* (2013.01); *G06F 3/04815* (2013.01); *H04N 9/3147* (2013.01); *H04N 13/39* (2018.05)

(56) References Cited

U.S. PATENT DOCUMENTS

| | | | |
|---|---|---|---|
| 8,441,467 B2 | 5/2013 | Han | |
| 8,743,089 B2 | 6/2014 | Sato et al. | |
| 2007/0247422 A1* | 10/2007 | Vertegaal | G06F 3/017 345/156 |
| 2008/0013793 A1* | 1/2008 | Hillis | G03H 1/0005 382/114 |
| 2010/0302137 A1* | 12/2010 | Benko | G06F 3/005 345/156 |
| 2011/0154233 A1* | 6/2011 | Lamarca | G06F 3/0425 715/764 |
| 2011/0164032 A1 | 7/2011 | Shadmi | |
| 2011/0205186 A1* | 8/2011 | Newton | G06F 3/011 345/175 |
| 2012/0044143 A1* | 2/2012 | Newton | G06F 1/1616 345/161 |
| 2012/0304126 A1 | 11/2012 | Lavigne et al. | |
| 2013/0207962 A1 | 8/2013 | Oberdorfer et al. | |
| 2013/0265220 A1* | 10/2013 | Fleischmann | G06F 3/011 345/156 |
| 2013/0283213 A1* | 10/2013 | Guendelman | G06F 3/017 715/848 |
| 2013/0300637 A1 | 11/2013 | Smits et al. | |
| 2013/0328770 A1* | 12/2013 | Parham | G06F 3/0304 345/157 |
| 2013/0343601 A1* | 12/2013 | Jia | G06K 9/00355 382/103 |
| 2014/0015804 A1* | 1/2014 | Mongia | G06F 1/3231 345/175 |
| 2014/0104168 A1* | 4/2014 | Hegde | G06F 3/017 345/157 |
| 2014/0157206 A1 | 6/2014 | Ovsiannikov et al. | |
| 2014/0201666 A1* | 7/2014 | Bedikian | G06F 3/017 715/771 |
| 2014/0282068 A1* | 9/2014 | Levkovitz | G06Q 20/223 715/748 |

OTHER PUBLICATIONS

Manolya Kavakli et al., "Designing in Virtual Reality (DesIRe): a Gesture-based interface," DIMEA '07 Perth, Western Australia, ACM, 2007, pp. 131-136.

* cited by examiner

VIRTUAL REALITY CLAMSHELL COMPUTING DEVICE

BACKGROUND

Computing devices have become ubiquitous in almost every facet of modern life. Computing technologies have improved the standard of living around the world, and more user-friendly technologies continue to be developed that assist a user in interacting with a computing device in order to manipulate the function of the computing device. One technology that has been recently developed is three-dimensional viewing of images. This technology often requires the use of specialty equipment such as stereoscopic viewing devices such as interference filter glasses or polarized glasses.

Computer keyboards, mouse devices, and other data input devices are devices that use an arrangement of buttons or keys that act as mechanical levers or electronic switches that cause input of a character to a computing device or otherwise control a computing device to which these input devices are communicatively coupled.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
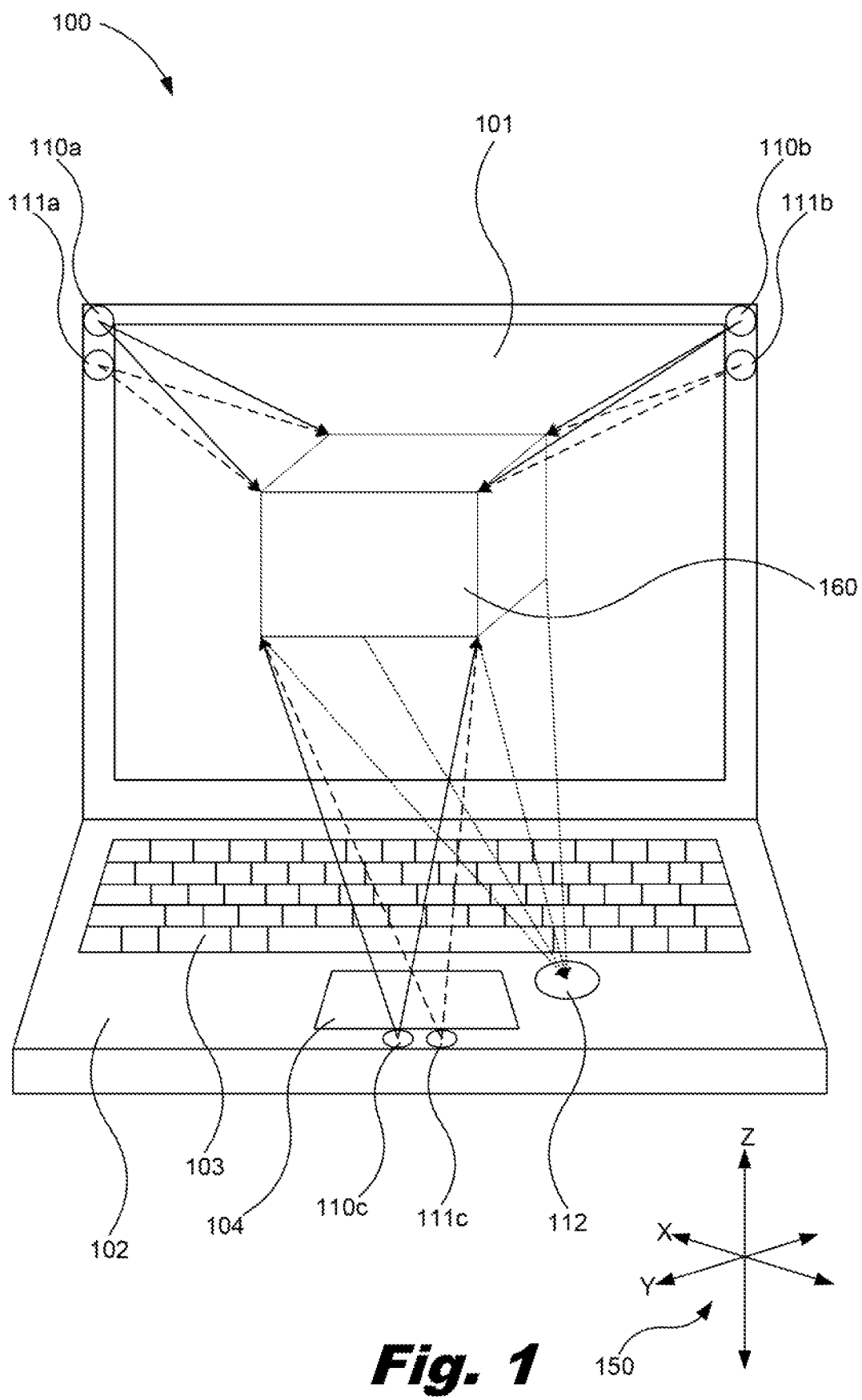
FIG. 1 is a front view of a laptop computing device for use in displaying and manipulating three-dimensional images, according to one example of the principles described herein.

The above-described input devices may contain mechanical parts that are easily broken. Further, these input devices increase the potential to suffer from injuries or illnesses such as carpal tunnel syndrome or other repetitive strain injury and illness due to the extensive spread of bacteria. Still further, these input devices are not intuitive when used to manipulate data in a three-dimensional data projection scenario.

The present systems and methods provide for the manipulation of three-dimensional images depicted in front of a computing device. In one example, the computing device is a clamshell laptop computing device. A number of projection devices are incorporated into the housing of the computing device, and are used to project a three-dimensional image in the space between the two clamshell halves of the laptop computing device. A number of infrared (IR) illumination devices are also incorporated into the housing of the computing device. The IR illumination devices illuminate a user's hand as the user interacts with the three-dimensional image projected by the projection devices. The projection devices are incorporated into the housing of the computing device at orthogonal locations. The IR illumination devices are also incorporated into the housing of the computing device at orthogonal locations. A number of IR sensors are also incorporated into the housing of the computing device to detect the IR wavelengths of light reflected off the user's hand. The computing device further comprises processor and memory. The memory comprises executable code that, when executed by the processor, extracts coordinate location data from the detected IR wavelengths reflected off the user's hand, interprets the coordinate location as a number of gestures performed by the user, and manipulates the display of the three-dimensional mage based on the interpreted gestures. In one example, three projection devices and three IR illumination devices are incorporated into the housing of the computing device. An image signal processor is used to analyze the signals received by the IR sensors, extract x, y, and z coordinate data from the signals, interpret the x, y, and z coordinate data as gestures intended to manipulate the three-dimensional image as displayed.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 2:
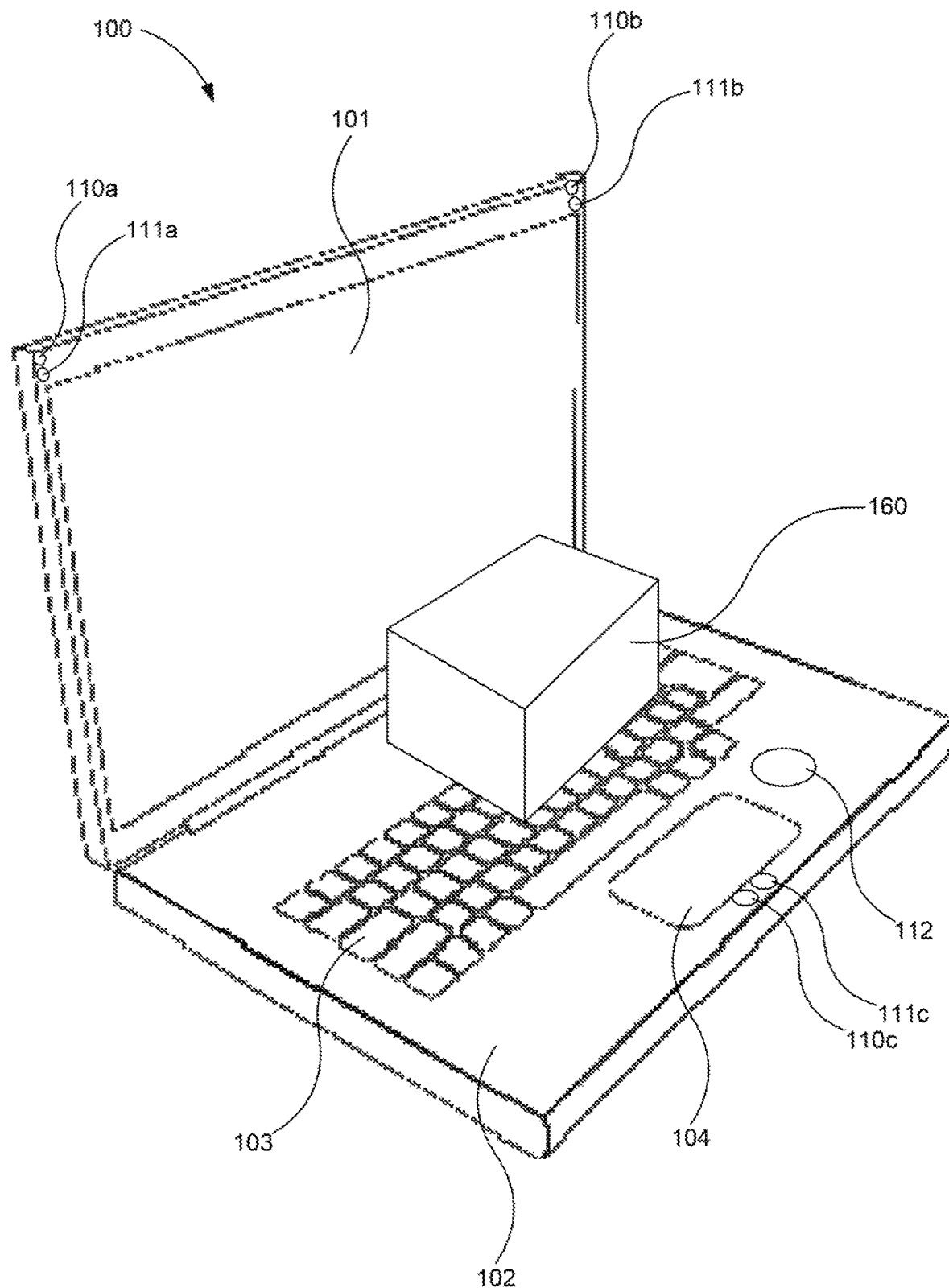
FIG. 2 is a perspective view of the laptop computing device of FIG. 1, according to one example of the principles described herein.

FIG. 1 is a front view of a laptop computing device (100) for use in displaying and manipulating three-dimensional images (160), according to one example of the principles described herein. FIG. 2 is a perspective view of the laptop computing device (100) of FIG. 1, according to one example of the principles described herein. As depicted in FIGS. 1 and 2, the laptop computing device (100) comprises two halves (101, 102) coupled in a clamshell form factor orientation where the first half (101) comprising a display, for example, folds via a hinge with respect to a second half (102) comprising a number of input devices and the electronics of the computing device (100), for example. Even though a laptop device is displayed and described throughout this description, any computing device may be used in connection with the present systems and methods including, for example, desktop computing devices, mobile clamshell devices, mobile smart phones, and kiosk computing devices such as automatic teller machines (ATMs), among many other types of computing devices.

The laptop computing device (100) comprises a number of input devices to input additional input to the laptop computing device (100) in addition, to the commands received through the three-dimensional interaction systems described herein. The input devices may include, for example, a keyboard (103) and a touch pad (104). However, any number or type of input devices may be incorporated, into or coupled to the laptop computing device (100).

As depicted in FIGS. 1 and 2, a number of projection devices (110a, 110b, 110c) are incorporated into the housing of the computing device (100). The projection devices (110a, 110b, 110c) will be collectively referred to herein as 110. In the example of FIGS. 1 and 2, the projection devices (110a, 110b, 110c) are located at orthogonal positions relative to one another as indicated by the x, y, z coordinate axis (150) depicted in FIG. 1. Thus, in the example of FIGS. 1 and 2, the a first projection device (110a) is located at the top left of the first half (101) of the clamshell form factor of the computing device (100), a second projection device (110b) is located at the top right of the first half (101) of the clamshell form factor of the computing device (100), and a third projection device (110c) is located at a center location of the second half (102) o of the clamshell form factor of the computing device (100). In this manner, the projection devices (110a, 110b, 110c) may project images at orthogonal directions relative to one another. Although three projection devices (110a, 110b, 110c) are depicted in FIGS. 1 and 2, any number of projection devices may be used to project a three-dimensional image.

The projection devices (110a, 110b, 110c) may be any type of device capable of projecting a three-dimensional image of an object. In one example, the projection devices (110a, 110b, 110c) use additional devices or environments such as louvers, glass panels, rotating transparent filaments, water vapor, smoke or other medium on which the three-dimensional object may be projected. In another example, these additional devices are not used in conjunction with the projection devices (110a, 110b, 110c).

In one example, the projection devices (110a, 110b, 110c) comprise three laser devices. In this example, the laser projectors lean or tilt in order to project a collimated light to the space between the first half (101) and second half (102) of the computing device (100). The laser projectors in this example may create plasma emissions from the nitrogen and oxygen in the air at a number of points of focus. Because plasma emission continues for a short period of time, the device is able to create 3D images by moving the point of focus. Pixels that form the three-dimensional projected object are generated as the focused collimated light from the laser projectors heat the oxygen and nitrogen molecules floating in the air, causing the molecules to spark in a phenomenon known as plasma emission. By rapidly moving these flashpoints in a controlled fashion, the laser projectors create a three-dimensional image that appears in the empty space between the first half (101) and second half (102) of the computing device (100).

Further, as depicted in FIGS. 1 and 2, a number of infrared (IR) illumination devices (111a, 111b, 111c) are incorporated into the housing of the computing device (100). The illumination devices (111a, 111b, 111c) will be collectively referred to herein as 111. In the example of FIGS. 1 and 2, the illumination devices (111a, 111b, 111c) are located at orthogonal positions relative to one another as indicated by the x, y, z coordinate axis (150) depicted in FIG. 1. Thus, in the example of FIGS. 1 and 2, a first illumination device (111a) is located at the top left of the first half (101) of the clamshell form factor of the computing device (100), a second illumination device (111b) is located at the top right of the first half (101) of the clamshell form factor of the computing device (100), and a third illumination device (111c) is located at a center location of the second half (102) of the clamshell form factor of the computing device (100). Thus, the IR illumination devices (111a, 111b, 111c) may illuminate a user's hand at orthogonal directions relative to one another. Thus, the IR illumination of the user's hands may be detected by an IR sensor (112) as will be described in more detail below. Although three illumination devices (111a, 111b, 111c) are depicted in FIGS. 1 and 2, any number of illumination devices may be used to illuminate a user's hand for hand detection purposes. The IR illumination devices (111a, 111b, 111c) support invisible light to improve the performance in, for example, low light conditions.

The computing device (100) as depicted in FIGS. 1 and 2 further comprises a number of infrared (IR) sensors (112). The IR sensors (112) are used to detect IR light projected by the illumination devices (111a, 111b, 111c) reflected off a user's hand. The IR sensors (112), therefore can detect the location, position, and gestures of the user's hands as the user gestures to manipulate the three-dimensional image (160) projected by the projection devices (110a, 110b, 110c). Although one illumination device (112) is depicted in FIGS. 1 and 2, any number of illumination devices may be used to detect the illumination of a user's hand.

In one example, two IR sensors (112) are provided with the computing device (100). In this example, the two IR sensors (112) are positioned at different locations relative to one another. In this manner, the two IR sensors (112) are able to detect depth of the user's hand as it interacts with a displayed three-dimensional object (160). The computing device (100) is capable of processing the data obtained from the two IR sensors to obtain the depth values.

As depicted in FIGS. 1 and 2, the three-dimensional image (160) is projected by the projection devices (110a, 110b, 110c) into a space located between the first half (101) and second half (102) of the computing device (100). In this example, the user may interact with the three-dimensional projected object (160). Interactions with the three-dimensional projected object (160) may include rotating the object in the x, y, z directions or combinations thereof, moving the object in the x, y, z directions or combinations thereof addressing surfaces of the object, changing the size of the object, zooming in or out of a portion of the object, exploding or imploding the object such that internal surfaces can be viewed or hidden, respectively, sweeping the object from view, scrolling through views of a number of objects, deletion of sub-components of the object, deletion of the object, addition of a sub-components to the object, annotating the object, or other types of three-dimensional object manipulation, or combinations thereof. More details regarding the manipulation of the three-dimensional projected object (160) and how the computing system (100) projects the manipulation of the object (160) according to the user's desired manipulation.

Figure 3:
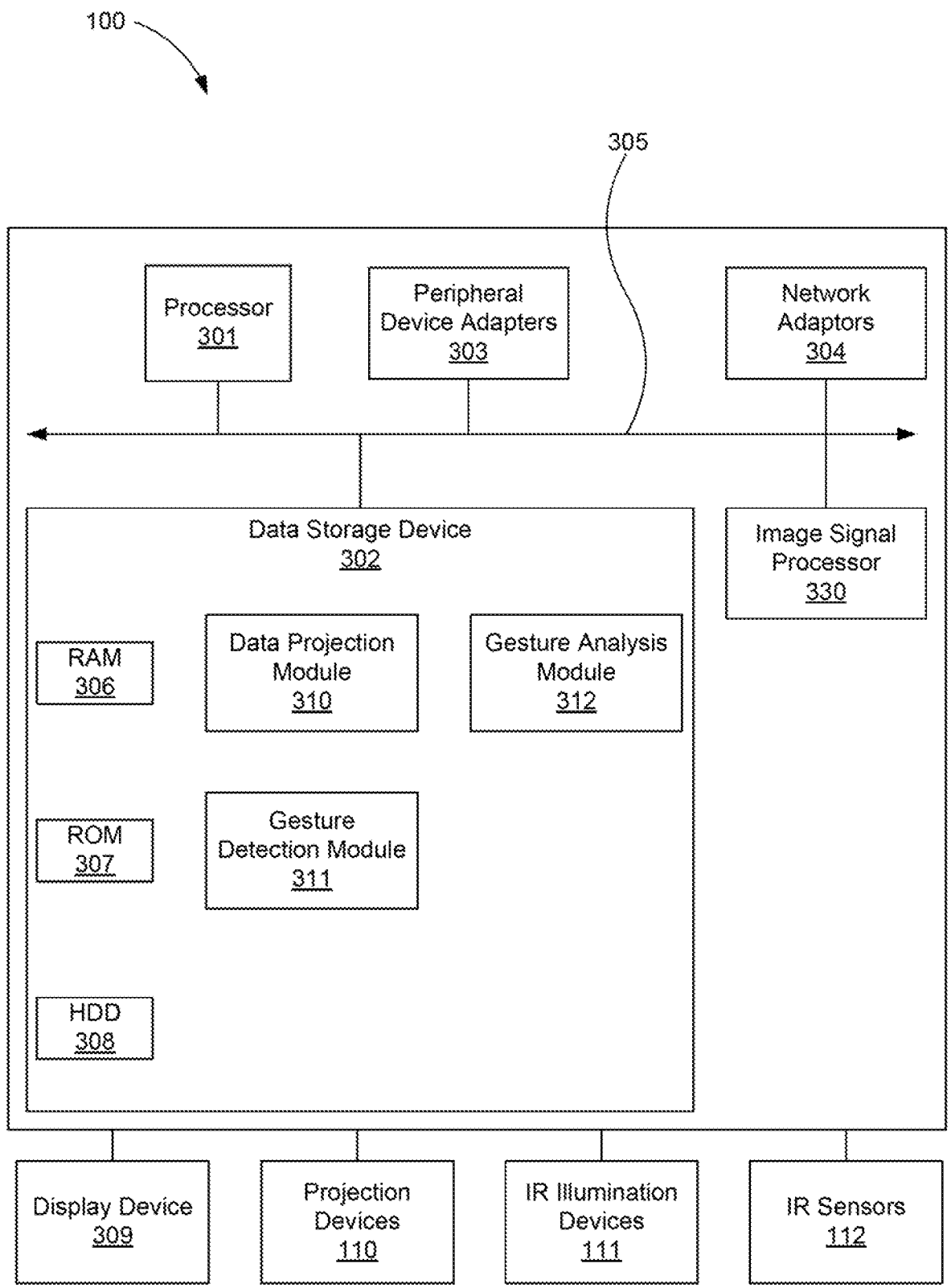
FIG. 3 is a block diagram of the laptop computing device of FIG. 1, according to one example of the principles described herein.

FIG. 3 is a block diagram of the laptop computing device, of FIG. 1, according to one example of the principles described herein. The computing device (100) may be implemented in an electronic device. Examples of electronic devices include servers, desktop computers, laptop computers, personal digital assistants (PDAs), mobile devices, smartphones, gaming systems, and tablets, among other electronic devices.

The computing device (100) may be utilized in any data processing scenario including, stand-alone hardware, mobile applications, through a computing network, or combinations thereof. Further, the computing device (100) may be used in a computing network, a public cloud network, a private cloud network, a hybrid cloud network, other forms of networks, or combinations thereof. In one example, the methods provided by the computing device (100) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as, a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (100) are executed by a local administrator.

To achieve its desired functionality, the computing device (100) comprises various hardware components, Among these hardware components may be a number of processors (301), a number of data storage devices (302), a number of peripheral device adapters (303), a number of network adapters (304), and a number of image signal processors (330). These hardware components may be interconnected through the use of a number of busses and/or network connections. In one example, the processor (301), data storage device (302), peripheral device adapters (303), a network adapter (304), and image signal processors (330) may be communicatively coupled via a bus (305).

The processor (301) may include the hardware architecture to retrieve executable code from the data storage device (302) and execute the executable code. The executable code may, when executed by the processor (301), cause the processor (301) to implement at least the functionality of projecting three-dimensional data in a space between two clamshell halves (101, 102) of the computing device (100) to create a three-dimensional scene, detecting a number of user gestures, extracting x, y, and z, coordinate data from the detected user gestures, interpreting data of the user gestures to produce gesture data defining how the gestures manipulate the three-dimensional scene, projecting the manipulation of the three-dimensional scene using the gesture data, among other functionality, or combinations thereof, according to the methods of the present specification described herein. In the course of executing code, the processor (301) may receive input from and provide output to a number of the remaining hardware units. In one example, the image signal processor (330) assists with the processing of data according to these functionalities, or, at the direction of the processor (301), performs the processing of data according to these functionalities.

The data storage device (302) may store data such as executable program code that is executed by the processor (301) or other processing device. As will be discussed, the data storage device (302) may specifically store computer code representing a number of applications that the processor (301) executes to implement at least the functionality described herein.

The data storage device (302) may include various types of memory modules, including volatile and nonvolatile memory. For example, the data storage device (302) of the present example includes Random Access Memory (RAM) (306), Read Only Memory (ROM) (307), and Hard Disk Drive (HDD) memory (308). Many other types of memory may also be utilized, and the present specification contemplates the use of many varying type(s) of memory in the data storage device (302) as may suit a particular application of the principles described herein. In certain examples, different types of memory in the data storage device (302) may be used for different data storage needs. For example, in certain examples the processor (381) may boot from Read Only Memory (ROM) (307), maintain nonvolatile storage in the Hard Disk Drive (HDD) memory (308), and execute program code stored in Random Access Memory (RAM) (306).

Generally, the data storage device (302) may comprise a computer readable medium, a computer readable storage medium, or a non-transitory computer readable medium, among others. For example, the data storage device (302) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (303, 304) in the computing device (100) enable the processor (301) to interface with various other hardware elements, external and internal to the computing device (100). For example, the peripheral device adapters (303) may provide an interface to input/output devices, such as, for example, display device (309), a mouse, or a keyboard. The peripheral device adapters (303) may also provide access to other external devices such as an external storage device, a number of network devices such as, for example, servers, switches, and routers, client devices other types of computing devices, and combinations thereof.

The display device (309) may be provided to allow a user of the computing device (100) to interact with and implement the functionality of the computing device (100). The peripheral device adapters (303) may also create an interface between the processor (301) and the display device (309), a printer, or other media output devices. The network adapter (304) may provide an interface to other computing devices within, for example, a network, thereby enabling the transmission of data between the computing device (100) and other devices located within the network.

The computing device (100) may, when executed by the processor (301), display the number of graphical user interfaces (GUIs) on the display device (309) associated with the executable program code representing the number of applications stored on the data storage device (302). The GUIs may display, for example, options available to a user to switch to or enable display of a three-dimensional projected object using the projection devices (110), IR illuminating devices (111), and IR sensors (112). Additionally, via making a number of interactive gestures on the GUIs of the display device (309), a user may toggle between interacting with the display device (309) of the computing device (100), and projecting and interacting with three-dimensional images (160) projected by the computing device (100).

Examples of display devices (309) include a computer screen, a laptop screen, a mobile device screen, a personal digital assistant (PDA) screen, and a tablet screen, among other display devices (309).

The computing device (100) further comprises a number of modules used in the implementation of projecting three-dimensional data in a space between two clamshell halves (101, 102) of the computing device (100) to create a three-dimensional scene, detecting a number of user gestures, extracting x, y, and z, coordinate data from the detected user gestures, interpreting data of the user gestures to produce gesture data defining how the gestures manipulate the three-dimensional scene, projecting the manipulation of the three-dimensional scene using the gesture data, among other functionality, or combinations thereof, according to the methods of the present specification described herein. The various modules within the computing device (100) comprise executable program code that may be executed separately. In this example, the various modules may be stored as separate computer program products. In another example, the various modules within the computing device (100) may be combined within a number of computer program products; each computer program product comprising a number of the modules.

The computing device (100) may include a data projection module (310) to, when executed by the processor (301) and/or the image signal processor (330), causes the projection devices (110) to project a three dimensional image of an object (160) or a manipulated version of the projected object (160). The computing device (100) may include a gesture detection module (311) to, when executed by the processor (301) and/or the image signal processor (330), causes the IR illumination devices (111) to illuminate the hands of a user, and detect the position, location, position, and gestures of the user's hands as the user gestures to manipulate the three-dimensional image (160) projected by the projection devices (110a, 110b, 110c). The computing device (100) may include a gesture analysis module (312) to, when executed by the processor (301) and/or the image signal processor (330), analyzes the gestures detected by the gesture detection module (311) and the IR illumination devices (111). The gesture detection module (311) interprets the data associated with the gestures as an instruction to the computing device to manipulate the projected image of the object (160) or as another command to the computing device (100) such as, for example, a command to output data representing the object (160) or a manipulated version of the object (160) to an output device such as the display device (309), a display device that displays images in three dimensions, or a three-dimensional printer.

Figure 4:
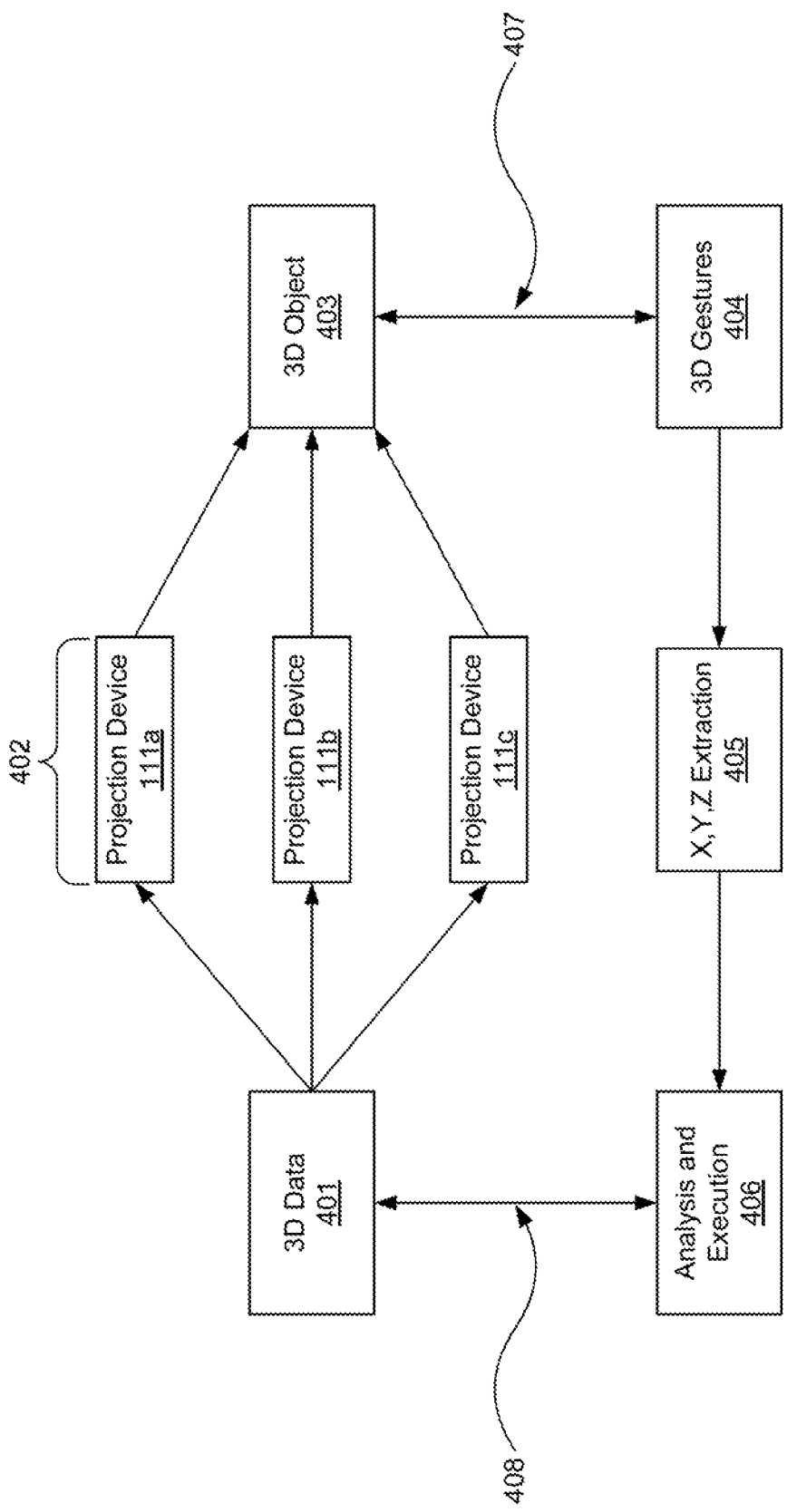
FIG. 4 is a block diagram depicting data flow through the laptop computing device of FIG. 1, according, to one example of the principles described herein.

FIG. 4 is a block diagram depicting data flow through the laptop computing device (100) of FIG. 1, according to one example of the principles described herein. Throughout the data flow within FIG. 4, the processor (101) and/or the image signal processor (330) are used to execute the data projection module (310), gesture detection module (311), the gesture analysis module (312), or other executable code. The data flow may begin by obtaining three-dimensional data representing an object (160) at block 401, and instructing the projection devices (110) at blocks 402 to project a representation of the object (160) as depicted at block 403. The user may then interact with the three-dimensional object (160) as indicated by arrow 407. The interaction (407) of the user with the three-dimensional object (160) is detected by the gesture detection module (311), when executed, causing IR illumination of the user's hands with the IR illumination devices (111a, 111b, 111c), and causing detection of the IR illumination by the IR sensors (112).

Data representing the detection and illumination of the user's hands is analyzed at blocks 405 and 406. At block 405, x, y, and z coordinate data is extracted from data representing the detection and illumination of the user's hands. This provides data representing the location, position, and gestures of the users hands as the user gestures to manipulate the three-dimensional image (160) projected by the projection devices (110a, 110b, 110c). At block 406, the data representing the location, position, and gestures of the user's hands is interpreted or analyzed to determine what the gestures mean by way of manipulation of the three-dimensional image (160) to create gesture data. The x, y, and z coordinate data is interpreted as gestures intended to manipulate the three-dimensional image (160) as displayed by the projection devices (111).

At arrow 408, the gesture data is used by the computing device (100) to present updated three-dimensional data at block 401 that will result in the projection of a manipulated version of the three-dimensional object (160) at block 403 using the projectors (111) at blocks 402.

Figure 5:
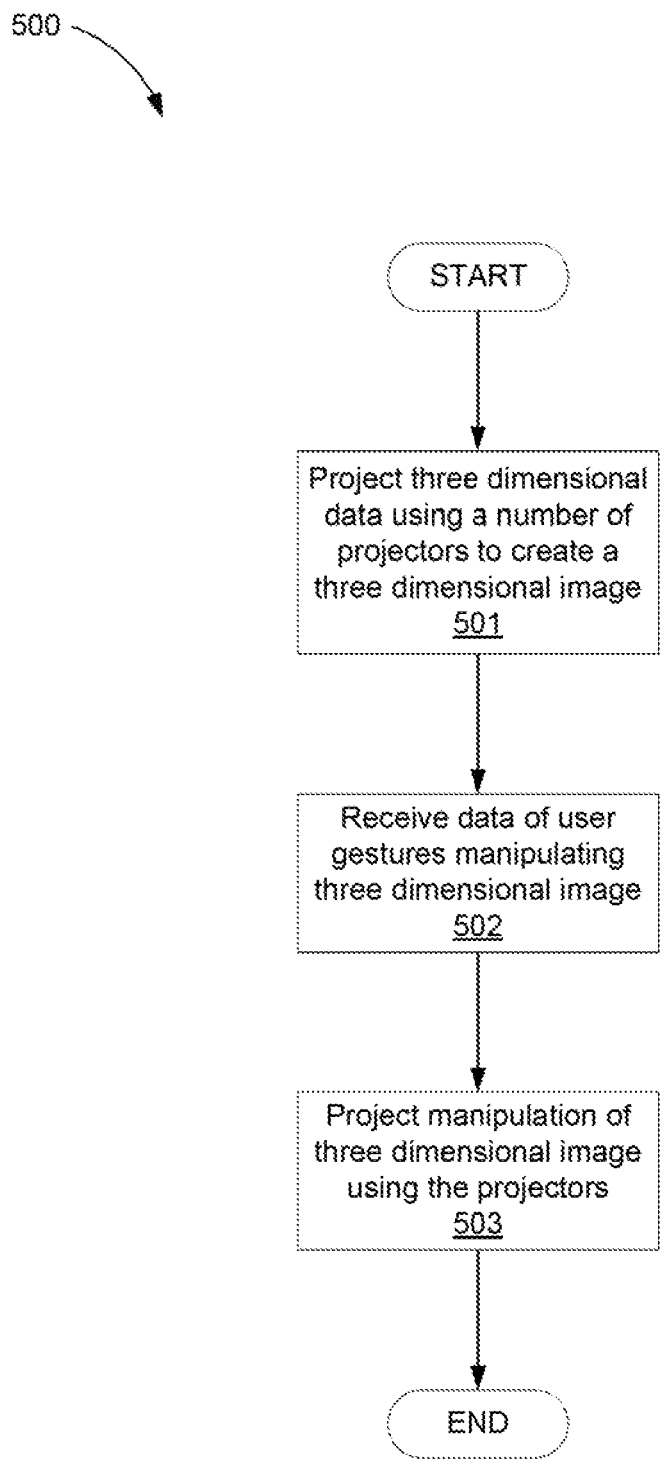
FIG. 5 is a flowchart showing a method of manipulating a three-dimensional object by detecting user gestures, according to one example of the principles described herein.

FIG. 5 is a flowchart showing a method (500) of manipulating a three-dimensional object (160) by detecting user gestures, according to one example of the principles described herein. The method (500) may begin by projecting (block 501) three-dimensional data using a number of projectors to create a three-dimensional image. The processor (301) and/or the image signal processor (330) execute the data projection module (310) to cause the projection devices (110) to project a three-dimensional image (160) defined by the three-dimensional data.

The method (500) may also include receiving (block 502) data of user gestures manipulating the three-dimensional image. The processor (301) and/or the image signal processor (330) execute the gesture detection module (311) to detect location, position, and gestures of the user's hands as the user gestures to manipulate the three-dimensional image (160) projected by the projection devices (110). This detection creates gesture data for later processing.

The method may further, include projecting (block 503) the manipulation of the three-dimensional image using the projectors (110). The processor (301) and/or the image signal processor (330) execute the gesture analysis module (311) and the data projection module (310) to interpret the gesture data, and project the manipulation of the three-dimensional image using the projectors (110).

Figure 6:
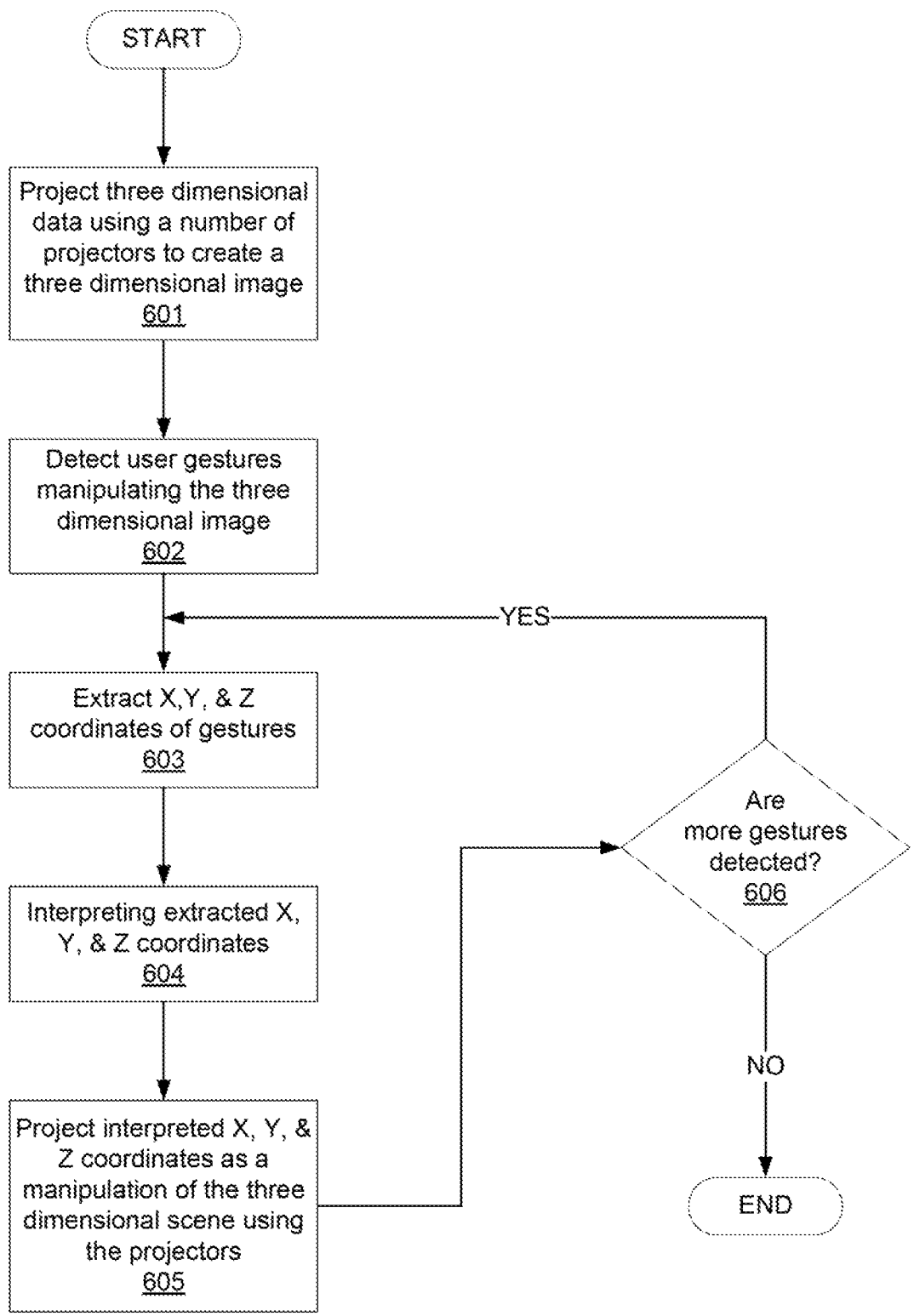
FIG. 6 is a flowchart showing a method of manipulating a three-dimensional object by detecting user gestures, according to another example of the principles described herein.

FIG. 6 is a flowchart showing a method (600) of manipulating a three-dimensional object (160) by detecting user gestures, according to another example of the principles described herein. The method (600) may begin by projecting (block 501) three-dimensional data using a number of projectors to create a three-dimensional image. The processor (301) and/or the image signal processor (330) execute the data projection module (310) to cause the projection devices (110) to project a three-dimensional image (160) defined by the three-dimensional data.

The method (600) may also include detecting (block 602) user gestures manipulating the three-dimensional image (160). The processor (301) and/or the image signal processor (330) execute the gesture detection module (311) to detect location, position, and gestures of the user's hands as the user gestures to manipulate the three-dimensional image (160) projected by the projection devices (110). This detection creates gesture data for later processing.

The method (600) further includes extracting (block 603) x, y, and z coordinates of the gestures. The processor (301)

and/or the image signal processor (330) execute the gesture detection module (311) to extract the x, y, and z coordinate data from the data representing the detection and illumination of the user's hands. This provides data representing the location, position, and gestures of the user's hands as the user gestures to manipulate the three-dimensional image (160) projected by the projection devices (110). The extraction (block 603) of x, y, and z coordinate data forms gesture data that defines the location, position, and gestures of the user's hands used by the user to manipulate the three-dimensional image (160).

The method may further include interpreting (block 604) the extracted gesture data defining the gesture data defining the extracted x, y, z, coordinates. The processor (301) and/or the image signal processor (330) execute the gesture analysis module (311) to interpret the gesture data. The gesture data defines a manner in which the user wishes the three-dimensional object to be manipulated. As described above, interactions with the three-dimensional projected object (160) may include rotating the object in the x, y, z directions or combinations thereof, moving the object in the x, y, z directions or combinations thereof addressing surfaces of the object, changing the size of the object, zooming in or out of a portion of the object, exploding or imploding the object such that internal surfaces can be viewed or hidden, respectively, sweeping the object from view, scrolling through views of a number of objects, deletion of sub-components of the object, deletion of the object, addition of a sub-components to the object, annotating the object, or other types of three-dimensional object manipulation, or combinations thereof.

The processor (301) and/or the image signal processor (330) execute the data projection module (310) to project the manipulation of the three-dimensional image using the projectors (110). The computing device (100) then determines (block 606) if more gestures are detected. If more gestures are detected (block 606, determination YES), the method (600) loops back to block 603 where x, y, and z coordinates of the gestures are extracted. If no more gestures are detected (block 606, determination NO), the method (600) terminates.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (301) and/or image signal processor (330) of the computing device (100) or other programmable data processing apparatus, implement the functions or acts specified in the flowchart and/or block diagram block or blocks. In one example, the computer usable program code may be embodied within a computer readable storage medium: the computer readable storage medium being part of the computer program product. In one example, the computer readable storage medium is a non-transitory computer readable medium.

The specification and figures describe a virtual reality clamshell computing device includes a number of projection devices to project a three-dimensional image, a number of infrared (IR) illumination devices to illuminate a user's hand, a number of IR sensors to detect IR wavelengths reflected off of the user's hand, a processor, and a memory. The memory includes executable code that, when executed by the processor, extracts coordinate location data from the detected IR wavelengths reflected off of the user's hand, interprets the coordinate location as a number of gestures performed by the user, and manipulates the display of the three-dimensional image based on the interpreted gestures. This virtual reality clamshell computing device may have a number of advantages, including: (1) providing an intuitive interaction with three-dimensional objects displayed to a user by a computing device; (2) alleviates or eliminates the malfunction of mechanical parts found in other types of input devices; (3) alleviates or eliminates sicknesses or injuries that accompany other types of input devices; (4) providing for the viewing and manipulation of a three-dimensional image with the naked eye and without specialty devices such as stereoscopic devices; and (5) providing the above advantages in a laptop platform, among other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A virtual reality clamshell computing device, comprising:
   a housing;
   multiple projection devices to project a three-dimensional image, which projection devices are embedded in the housing;
   a number of infrared (IR) illumination devices to illuminate a user's hand;
   a number of IR sensors to detect IR wavelengths reflected off of the user's hand;
   a processor; and
   a memory, the memory comprising executable code that, when executed by the processor:
      extract coordinate location data from the detected IR wavelengths reflected off of the user's hand,
      interpret the coordinate location as a number of gestures performed by the user, and
      manipulate the display of the three-dimensional image based on the number of gestures as interpreted.

2. The virtual reality clamshell computing device of claim 1, in which the multiple projection devices is three, and in which the projection devices are placed at three orthogonal locations with respect to each other.

3. The virtual reality clamshell computing device of claim 2, wherein:
   a first and second projection devices are disposed on a first half of the computing device; and
   a third projection device is disposed on a second half of the computing device to generate the three-dimensional image between the halves of the computing device.

4. The virtual reality clamshell computing device of claim 1, in which the IR illumination devices are IR light emitting diodes (LEDs).

5. The virtual reality clamshell computing device of claim 1, in which the number of IR illumination devices is three, and in which the IR illumination devices are placed at three orthogonal locations with respect to each other.

6. The virtual reality clamshell computing device of claim 1, in which the IR illumination devices, and the IR sensors are embedded into the housing of the virtual reality clamshell computing device.

7. The virtual reality clamshell computing device of claim 1, in which the projection devices project the three-dimensional image in a space between two halves of the clamshell computing device.

8. The virtual reality clamshell computing device of claim 1, wherein the multiple projection devices comprise laser devices to form plasma emissions.

9. The virtual reality clamshell computing device of claim 1, wherein the multiple projection devices tilt to project collimated light to a space between a first half and a second half of the computing device.

10. A method of manipulating a three-dimensional scene by detecting user gestures comprising:
    projecting three-dimensional data by combining projections from two projectors in a top half of a clamshell computing device and one projector in a bottom half of the clamshell computing device to create a three-dimensional image between a display and an input device of a computing device;
    receiving data of user gestures manipulating the three-dimensional image; and
    projecting the manipulation of the three-dimensional image using the projectors,
    wherein the projectors comprise laser devices to form plasma emissions.

11. The method of claim 10, further comprising detecting the user gestures to produce the data of the user gestures manipulating the three-dimensional scene.

12. The method of claim 11, further comprising extracting x, y, and z, coordinate data from the detected user gestures.

13. The method of claim 12, further comprising interpreting the extracted x, y, and z coordinate data as the user gestures.

14. The method of claim 13, further comprising, with the projectors, projecting the interpreted x, y, and z coordinate data as a number of manipulations to the three-dimensional scene.

15. The method of claim 10, wherein projecting three-dimensional data using the number of projectors to create the three-dimensional image comprises projecting the three-dimensional image in a space between two halves of a clamshell computing device, the projectors being located within a housing of the clamshell computing device.

16. A computer program product for manipulating a three-dimensional scene by detecting user gestures, the computer program product comprising:
    a non-transitory computer readable storage medium comprising computer usable program code embodied therewith, the computer usable program code, when executed by a processor:
    projects three-dimensional data in a space between two clamshell halves of a computing device by combining projections from two projection devices in a top clamshell half and one projection device in a bottom clamshell half to create the three-dimensional scene using multiple projection devices, wherein:
        the multiple projection devices being positioned at orthogonal angles relative to one another; and
        pixels of the three-dimensional scene are generated by moving focused collimated light from each projection device;
    detects a number of user gestures;
    interprets data of the user gestures to produce gesture data defining how the gestures manipulate the computing device;
    projects a manipulation of the three-dimensional scene based on the gesture data;
    manipulates the function of the computing device based on the gesture data; and
    toggles between interacting with a display device of the computing device and interacting with the three-dimensional scene,
    wherein the multiple projection devices comprise a first projection device housed in the top clamshell half surrounding a display device located in the top clamshell half of the computing device and a second projection device housed in the bottom clamshell half surrounding an input device located in the bottom clamshell half of the computing device.

17. The computer program product of claim 16, further comprising:
    computer usable program code to, when executed by a processor, extract x, y, and z, coordinate data from the detected user gestures.

18. The computer program product of claim 17, in which the computer usable program code to, when executed by a processor, interpret data of the user gestures to produce the gesture data comprises computer usable program code to, when executed by a processor, interpret the extracted x, y, and z coordinate data as the user gestures.

19. The computer program product of claim 16, further comprising computer usable program code to, when executed by a processor, interpret data of the user gestures as a switch between commands to the computing device and commands to manipulate of the three-dimensional scene.

20. The computer program product of claim 16, wherein the projection devices comprise laser devices that form plasma emissions.

* * * * *